United States Patent Office 3,373,477
Patented Mar. 19, 1968

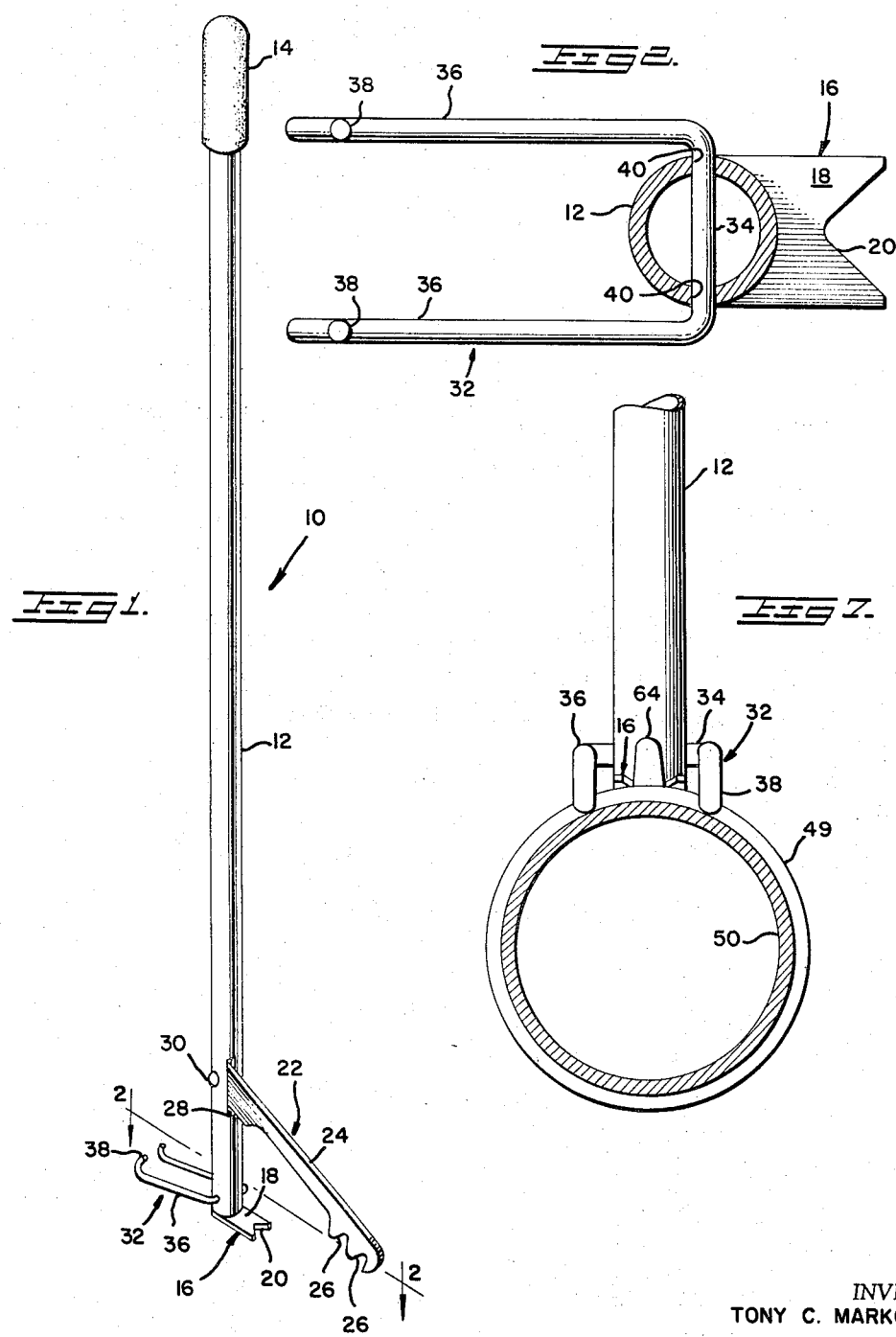

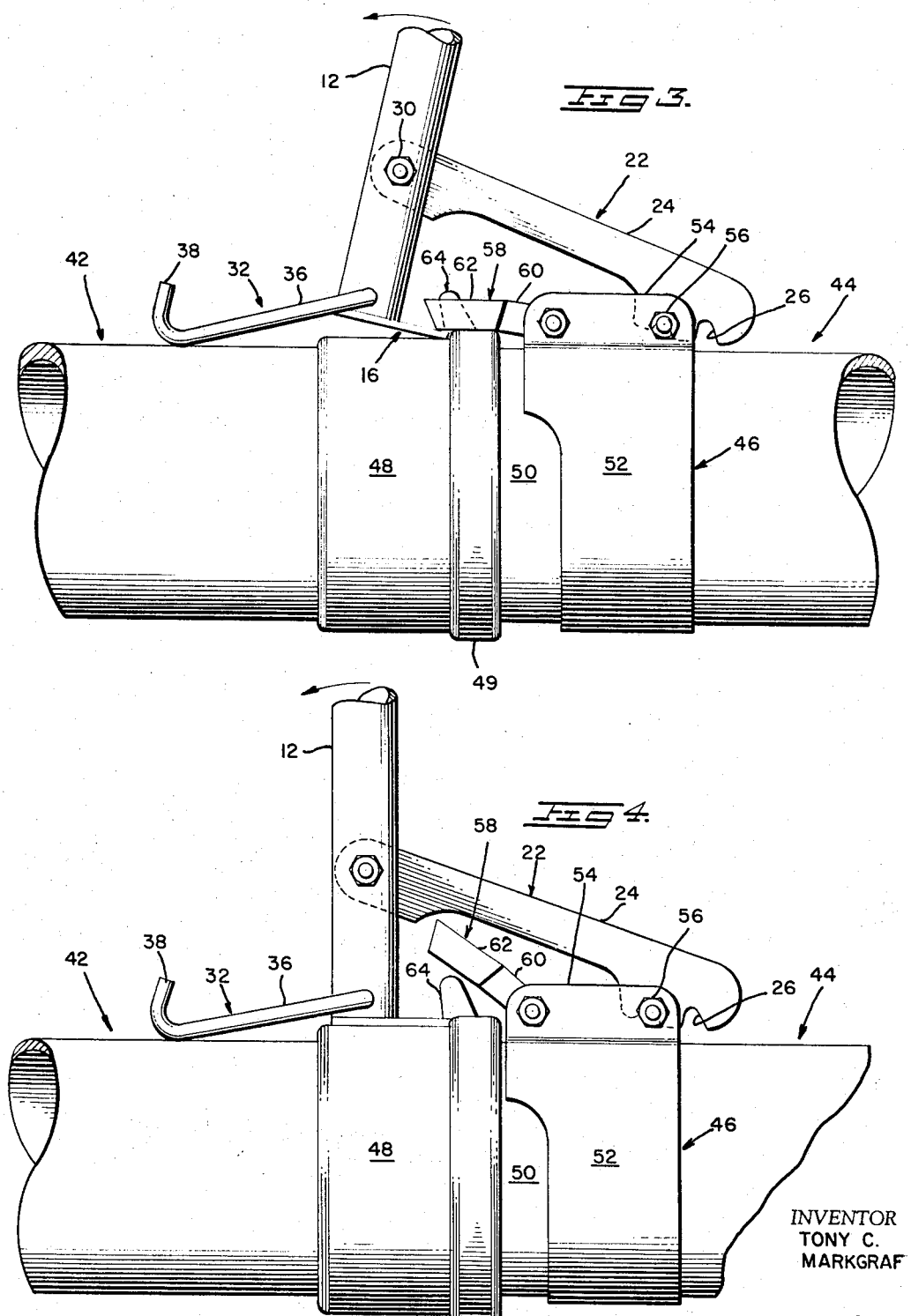

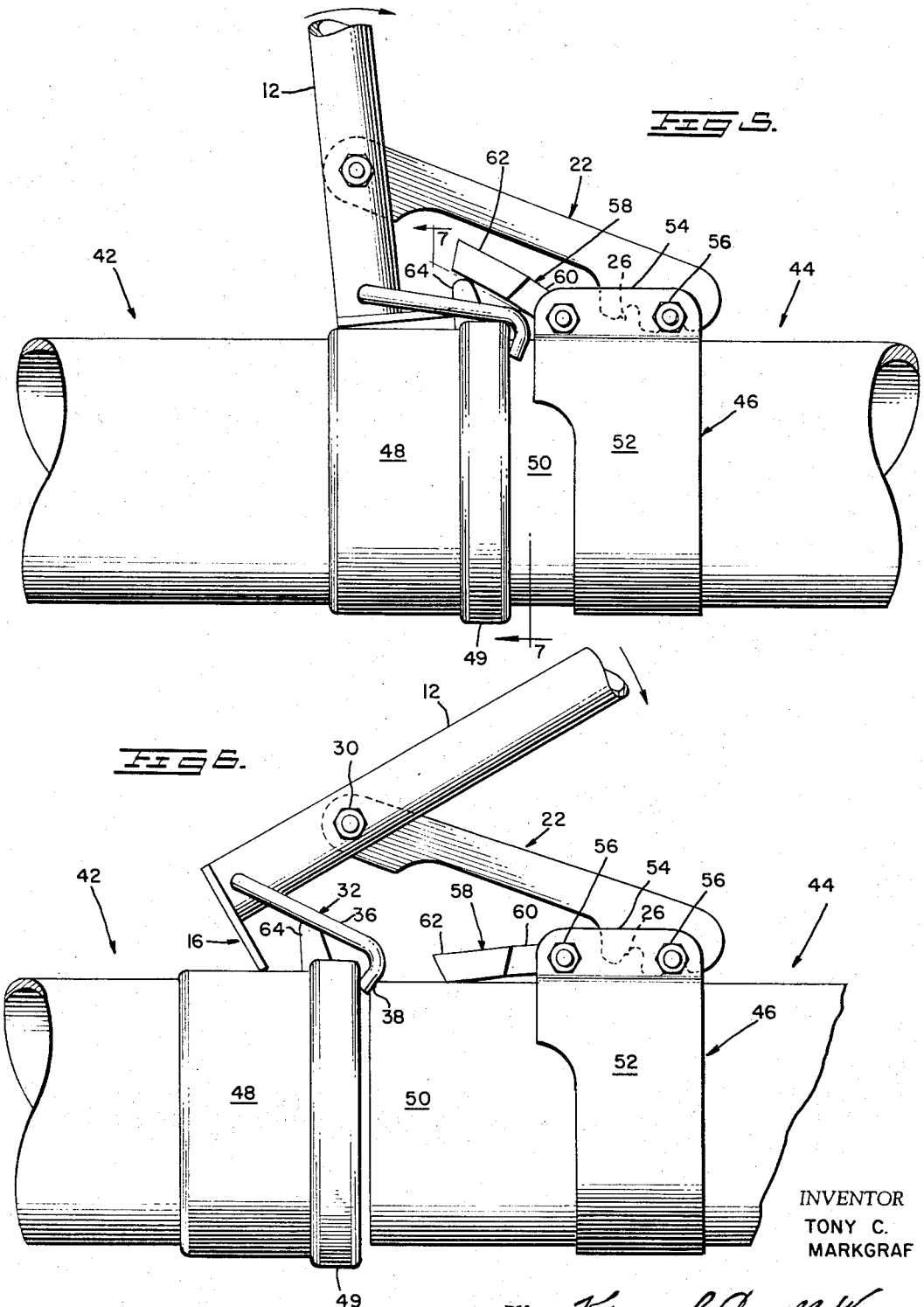

3,373,477
PIPE TOOL
Tony C. Markgraf, Sutherland Springs, Tex. 78161
Filed Oct. 3, 1966, Ser. No. 583,693
10 Claims. (Cl. 29—237)

This invention relates to improvements in pipe uncoupling devices, and more particularly to a tool for disassembling conduits connected together by a locked coupling.

In the construction of permanent pipe lines adjacent joints are normally either welded or threaded together to insure a pressure-tight connection. In many instances, however, it is more desirable to form a temporary pipe line which can be disassembled at one location and reassembled at another location. Temporary pipe line installations are commonplace in irrigating agricultural fields as well as in other environments. Although many types of couings have been proposed and used, one common type is provided with a support secured to one end of one conduit and carries a movable lug engaging member with a lug being provided on the other conduit end. To assemble two joints of pipe equipped with such a coupling, the male end of the first joint is inserted into the female end of the second joint with the lug engaging member registering with the lug to preclude separation of the joint.

When it is necessary to dismantle such a pipe line, it is often necessary to use a hammer or other impacting device to manipulate the lug engaging member and the coupling support. It has been found that the disassembling procedure is unnecessarily time-consuming and often results in damaged couplings thereby increasing the ultimate cost of pipe line use.

Tools assisting in the assembly and disassembly of conduits having male and female ends are well known in the prior art as exemplified by United States Patents Nos. 2,670,174, 2,719,695, 3,036,372, and 3,096,572. A brief examination of these prior art devices will show that they are not particularly adapted for use with a locked coupling of the type previously mentioned. In addition, the devices of the aforementioned patents are unduly complex and require some means for grasping one of the conduit ends in order to assemble or disassemble the joints.

In brief terms, the device of the instant invention overcomes the disadvantages of the prior art devices by moving the coupler support toward the lug thereby allowing disengaging movement of the coupling. The device of the instant invention is also equipped with means for separating the male and female ends of the pipe joints after the coupling has been unlocked.

It is a primary object of the instant invention to provide a simple inexpensive tool for disassembling conduits held together by a latched coupling.

Another object of the instant invention is to provide a tool which may be hand manipulatable for separating registered male and female conduit ends after the coupling has been unlatched.

Still another object of the instant invention is to provide an uncoupling device for disassemblable conduits connected together by a lock-type coupling in which the coupling is initially moved to an unlocking position followed by using the coupling as a support to separate the registered male and female conduit ends.

A still further object of the instant invention is to provide an uncoupling device of the character described which is readily portable, inexpensive, simple and which requires a minimum of maintenance.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of the instant inventive concept.

In the drawings:

FIGURE 1 is an isometric view of the pipe uncoupling device of the instant invention;

FIGURE 2 is an enlarged horizontal cross-sectional view of the uncoupling device of FIGURE 1 taken substantially along line 2—2 thereof as viewed in the direction indicated by the arrows;

FIGURE 3 is a partial view of the uncoupling device of the instant invention associated in operative relation with a conduit joint immediately prior to the unlatching of the coupling device;

FIGURE 4 is a partial view similar to that of FIGURE 3 illustrating the operative relationship of the uncoupling device and conduits immediately after the unlatching operation is complete;

FIGURE 5 is another partial view of the uncoupling device of the instant invention illustrated in operative relation with a pair of conduits immediately prior to the separation of the male and female ends of the conduits;

FIGURE 6 is a partial view similar to that of FIGURE 5 immediately after the separating operation has been completed; and FIGURE 7 is a vertical cross-sectional view of the uncoupling device of FIGURE 5 taken substantially along line 7—7 thereof as viewed in the direction indicated by the arrows illustrating the operative relationship between the female conduit end and the tool portion in engagement therewith.

Referring now to the drawings in detail, wherein like reference characters designate like elements throughout the several views thereof, the uncoupling device of the instant invention is designated generally at 10 and includes a force applying arm 12 having a suitable handle 14 at one end thereof and a foot designated generally at 16 at the other end. Foot 16 is comprised of a plate 18 extending away from arm 12 and forming a V-shaped notch 20 on the terminal end thereof.

A coupler contacting leg shown generally at 22 is preferably comprised of a metallic bar 24 having an enlarged free end forming a plurality of notches 26 constituting means for engaging the coupling. Force supplying arm 12 forms a slot 28 facing in generally the same direction as foot 16 with a suitable fastener 30, such as a nut and bolt, securing leg 22 to arm 12 for pivotal movement about an axis generally transverse to the axis of foot 16 and leg 22.

A collar contacting member illustrated generally at 32 is movably mounted on arm 12 for movement between an inoperative position shown in FIGURES 3 and 4 to an operative position illustrated in FIGURES 5 and 6 for selectively engaging the exposed end of the female conduit as shown best in FIGURES 5 to 7 inclusive. Collar contacting member 32 preferably includes a bail comprised of a bight portion 34, a pair of arms 36 extending away from bight portion 34 with the terminal ends 38 of arms 36 being reverted for purposes more fully explained hereinafter. Although collar contacting member 32 may be movably mounted on arm 12 in any convenient manner, a pair of aligned apertures 40 are preferably provided in arm 12 for pivotally receiving bight portion 34. For purposes of orientation, it should be noted that the axis of apertures 40 is generally transverse to the axis of foot 16, leg 22 and collar contacting member 32.

Referring now to FIGURES 3 to 7 inclusive, the uncoupling device of the instant invention is usable to disconnect a pair of conduits shown generally at 42, 44 connected together by a coupling designated generally at 46. Conduit 42 is illustrated as including a female end or collar 48 having an internal diameter substantially equal to the diameter of the male end 50 of conduit 44.

Coupling 46 includes a support 52 secured to male end 50 of conduit 44 and is illustrated as a band forming a major portion of a circle equipped with a pair of upstanding flanges 54 connected together by a plurality of adjustable fasteners 56 illustrated as nuts and bolts. It will be readily apparent that support 52 can be tightened onto conduit 44 by the adjustment of fasteners 56. Coupling 46 also includes a lug engaging member designated generally at 58 having a stem 60 received by one of fasteners 56 providing for the pivotal movement of lug engaging member 58. Member 58 also includes an annular section 62 forming an internal opening for receiving a lug 64 as shown best by a comparison of FIGURES 3 and 4.

In the assembly of conduits 42, 44 the male end 50 of conduit 44 is inserted into collar 48 of conduit 42 with lug engaging member 58 being pivoted downwardly to receive lug 64 as shown in FIGURE 3. Fasteners 56 are tightened to the extent that support 52 snugly surrounds conduit 44 thereby precluding separation of conduits 42, 44 when a pressurized fluid is introduced into the pipe line of which conduits 42, 44 are a part. When a pressurized fluid is introduced into conduits 42, 44 the male end 50 of conduit 44 expands somewhat thereby binding the connection of male and female ends 48, 50 and binding support 52 about conduit 44.

When it is desired to disassemble the pipe line, the pressure source or pump is turned off. Since a considerable amount of pressurized fluid remains in the pipe line and since the pressure does not immediately dissipate to allow for ready uncoupling of conduits 42, 44, it is frequently necessary to use a hammer or other impact tool to cam lug engaging member 58 out of contact with lug 64. The forced uncoupling of member 58 and lug 64 often results in breaking or otherwise damaging coupling 46. In many it is necessary to wait a considerable length of time for the pressure within the pipe line to dissipate before the coupling can be unlatched even with an impact tool. It will be readily seen that a great deal of time is wasted in the previously accepted manner of disconnecting conduits 42, 44. Another disadvantage of the uncoupling method presently used is that coupling 46 is often damaged beyond repair and must be replaced thereby necessitating capital outlay and resulting in further time loss.

Referring now to FIGURES 3 and 4, the unlatching procedure will be explained. Tool 10 is positioned on collar 48 such that foot 16 engages bead 49 of collar 48 and underlies annular member 62 with notch 20 of foot 16 receiving lug 64. Coupling contacting leg 22 is then manipulated to position rearmost notch 26 on the shank of fastener 56 between flanges 54 of support 52. Counterclockwise rotation of force supplying arm 12 binds foot 16 against lug 64 thereby bracing the lower end of arm 12 against movement toward conduit 44. This counterclockwise rotation of arm 12 also causes leg 22 to move toward conduit 42 and results in the movement of support 52 toward the terminal end of conduit 44 as may be seen in a comparison of FIGURES 3 and 4. Since the binding forces between member 58 and lug 64 are released by the movement of coupling 46, it will be seen that lug engaging member 58 is readily movable to a position out of engagement with lug 64 as shown in FIGURE 4. Under some circumstances it will be evident that foot 16 may act as a camming element to disengage member 58 from lug 64.

After the unlatching of coupler 46 has been completed, the connection formed by conduits 42, 44 is ready to be disassembled by producing relative movement between conduits 42, 44. Coupling contacting leg 22 is manipulated to position foremost notch 26 on the shank of fastener 56 with collar contacting member 32 being moved from the inoperative position shown in FIGURES 3 and 4 to the collar engaging position shown in FIGURES 5 to 7 inclusive. It should be noted that the position of collar 46 is illustrated as slightly separated from collar 48 in FIGURE 5 whereas FIGURE 4 illustrates coupling 46 closer to collar 48. This showing is merely for clarity of illustration since support 52 is normally much thinner than the bead on collar 48 which allows reverted ends 38 of member 32 to engage collar 48 even when coupling 46 is in the position shown in FIGURE 4. Clockwise rotation of force applying arm 12 creates a force between collar 48 and support 52 tending to separate collar 48 from support 52 which is normally snugly engaged with conduit 44. Foot 16 cooperates in the separating operation to preclude undesirable movement of the lower end of arm 12 and assist in providing a rectilinear stationary fulcrum for arm 12. Because of the difference in frictional forces between support 52 and conduit 44 and frictional forces between male end 50 and collar 48, conduits 42, 44 are separated by the clockwise movement of arm 12 even though some movement of support 52 along conduit 44 may result.

Although tool 10 has been hereinbefore described as a pipe uncoupling tool and even though its primary utility is presently believed to reside in the disconnecting of conduits, it should be readily apparent that tool 10 may be used in the assembly of conduits 42, 44 in the event that movement of coupling 46 is required.

It is now seen that there is herein provided an improved pipe tool which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. A pipe tool for assemblable and disassemblable conduits having male and collared female ends connected together by a coupling of the type having a support secured to one of the conduits, a lug on the other conduit and a lug engaging member on the support for engagement with the lug to secure the conduits together, the tool comprising:

a force applying arm;
means on the arm for grasping the coupling support and the other conduit and moving the support toward the other conduit upon movement of the arm in order to free the lug engaging member from the lug; and
means on the arm for grasping the coupling support and the other conduit and moving the support away from the other conduit upon movement of the arm producing a force tending to separate the conduits.

2. The pipe tool of claim 1 wherein the first mentioned means includes a foot on the end of the arm for binding engagement with the collared female end and a leg, pivotally mounted on the arm above the foot, having means thereon for engaging the coupling support.

3. The pipe tool of claim 2 wherein the second mentioned means includes the foot, the leg and a collar contacting member, pivotally mounted on the arm above the foot, having means thereon for engaging the collared female end.

4. A tool for assemblable and disassemblable conduits having male and collared female ends connected together by a coupling of the type having a support secured to one of the conduits, a lug on the other conduit and a lug engaging member movably mounted on the support for engagement with the lug to secure the conduits together, the tool comprising:

a force applying arm;
a foot, in one end of the arm, extending outwardly thereof for engaging the collared female end and bracing the device against movement toward the other conduit;
a coupler contacting leg, extending away from the arm in generally the same direction as the foot, having means thereon for engaging the coupling, for transmitting forces applied by the arm to the coupling in both directions parallel to the axis of the assembled conduits;

means mounting the leg on the arm above the foot for pivotal movement about an axis generally transverse to the foot and leg;

a female end contacting member, extending away from the arm in generally the opposite direction as the foot and leg for transmitting forces applied by the arm to the female conduit in a direction tending to separate the conduits; and means mounting the female end contacting member on the arm above the foot for pivotal movement from an inoperative position out of engagement with the female conduit end to an operative position engaging the exposed end of the female conduit.

5. The tool of claim 4 wherein the coupler engaging means includes a plurality of notches on the free end of the leg.

6. The tool of claim 4 wherein the foot includes a notched terminal end for receiving the lug.

7. The tool of claim 4 wherein the female end contacting member includes at least one arm having a reverted end portion for surrounding a portion of the female conduit end.

8. The tool of claim 4 wherein the female end contacting member includes a bail, the arms of which form a reverted portion for surrounding a portion of the female conduit end.

9. The tool of claim 8 wherein the contacting member mounting means includes aligned apertures in the arm receiving the bight portion of the bail.

10. The uncoupling device of claim 4 wherein the contacting member is between the foot and the leg.

References Cited

UNITED STATES PATENTS 2,958,125   11/1960   Nichols _____ 29—237
3,281,929   11/1966   Shinnick _____ 29—237

MILTON S. MEHR, *Primary Examiner.*